Feb. 27, 1951 C. W. HOYT 2,543,720

ELECTROMAGNETIC DEFLECTION CIRCUIT

Filed Aug. 10, 1949

INVENTOR
Clyde W. Hoyt
BY
[signature]
ATTORNEY

Patented Feb. 27, 1951 2,543,720

UNITED STATES PATENT OFFICE 2,543,720

ELECTROMAGNETIC DEFLECTION CIRCUIT

Clyde W. Hoyt, Pennsauken Township, Camden County, N. J., assignor to Radio Corporation of America, a corporation of Delaware Application August 10, 1949, Serial No. 109,481

14 Claims. (Cl. 315—27)

Figure 1:
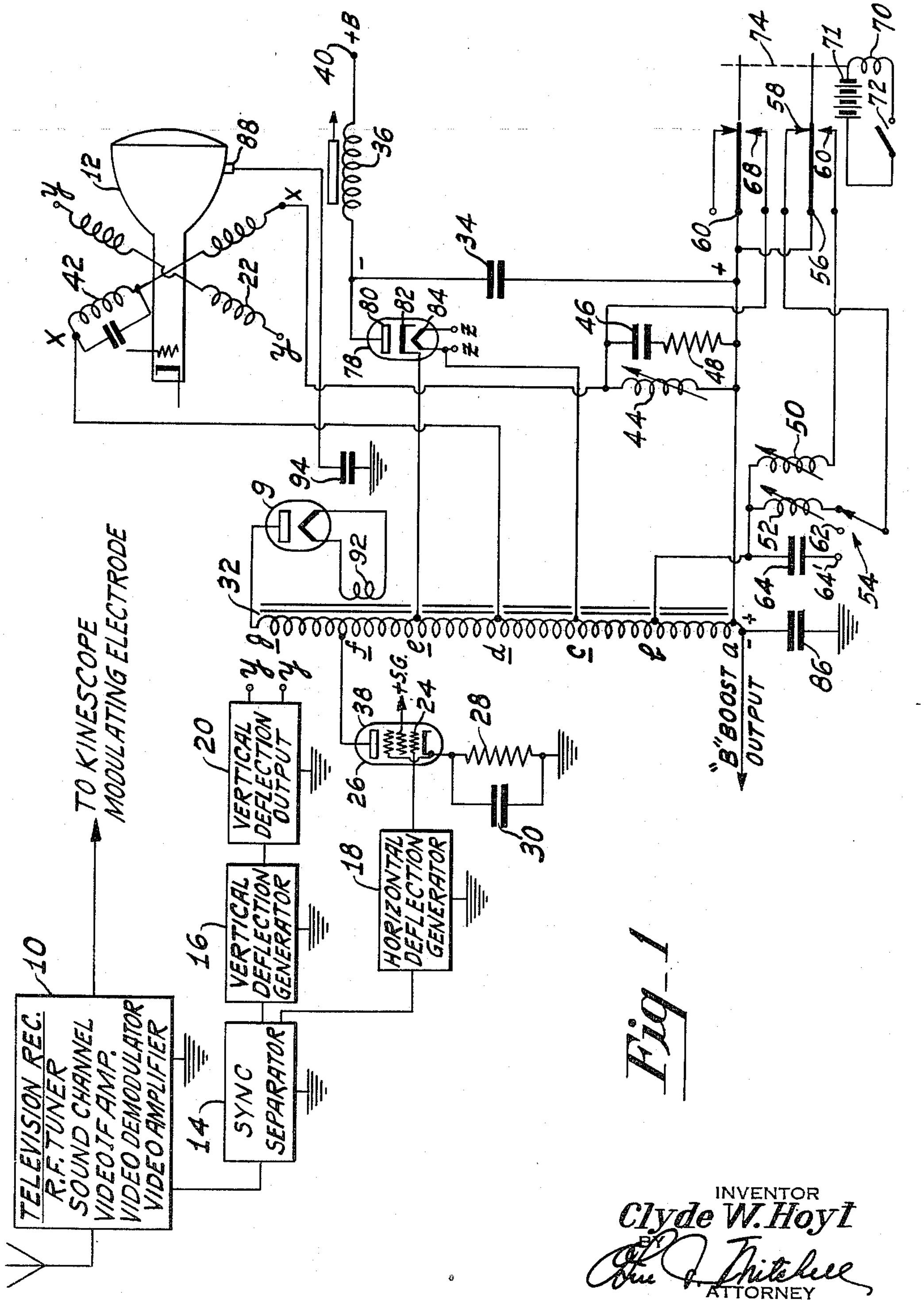

The present invention relates to electromagnetic deflection circuits, and more particularly, although not necessarily exclusively, to electromagnetic deflection circuits of the type suitable for use with cathode ray equipment such as, for example, cathode ray trace or image producing tubes or kinescopes.

In more particularity, the present invention is concerned with a novel form of deflection circuit which features an unusually large range of deflection signal amplitude control.

The present invention deals more directly with a novel form of deflection circuit suitable for use in television receiver equipment wherein it is desirable to provide a manually controllable arrangement for selecting at least two predetermined deflection amplitudes substantially different from one another such that the screen area covered by individual optical components of the received television view may be effectively altered at will.

Past and present-day television broadcasting and receiving techniques have made image signals available to users of television receivers representing a television view having a composition controllable only by studio cameramen and technicians handling the broadcast. The user of the television receiver therefore was forced to be content with the composition of the transmitted picture substantially at it appears in the screen area of his television receiver. If, for example, a particular portion of the television scene is of greater interest to him than others, the receiver user, prior to this invention, was provided with no convenient and readily accessible means at his disposal for magnifying or otherwise inspecting more closely this particular portion of the received picture without incurring the expense of external optical devices.

It is well known, that in accordance with present television standards, television viewing rasters are defined by the action of an illuminated point or spot being swept over a viewing surface concomitantly in both the horizontal and vertical direction. More commonly this viewing raster is generated on the fluorescent screen of a cathode ray kinescope or projection tube with the size of the viewing raster being limited by the dimensions of the reproducing tube. Generally, the image raster formed is in turn viewed through an opening in an otherwise opaque mask, the opening in the mask corresponding substantially in size to the actual television raster traversed by the spot. It is therefore possible by increasing the amplitude of the spot deflection in both the horizontal and vertical direction, so that the spot is deflected well beyond the limits of the predetermined and in some instances restricted viewing area defined by the opaque mask, to make the picture information falling within the viewing area appear greatly magnified just as though the camera scanning the object at the studio were moved much closer to the object. Although the overall picture detail transmitted, due to a limit in the bandwidth allotted to each television transmitter, remains substantially constant with the detail of the simulated "close-up" view thereby being in fact reduced, it has been found that a very useful "close-up" effect having a high entertainment value is provided by such control of the deflection.

In practice it is found that to obtain this "close-up" viewing in television receivers through the agency of increasing deflection amplitudes, considerable strain is imposed on deflection circuit arrangements designed for ordinary television deflection work. In earlier systems, amplitude control of the deflection circuit was, of course, provided but only on what might be considered a vernier basis allowing control of the raster size over only that small range necessary to compensate for difference in power line voltages and allowable and accepted manufacturing discrepancies in the mass production of such circuits. However, in order to achieve the above discussed "close-up" viewing, it is considered necessary to provide a deflection amplitude expansion capability of both the horizontal and vertical deflection circuits in the order of about 25% or so. As a result, the different loading effects on the output discharge tube providing the deflection signal over these wide levels cause the waveform of the deflection signal with apparatus of the usual type to vary considerably thereby producing objectionable distortion in the picture when in its "close-up" or expanded phase, that is, assuming of course that picture linearity was acceptably adjusted for normal amplitude viewing.

Of the various methods known in the art for controlling the amplitude of electromagnetic deflection systems, perhaps none are better known than the shunt inductance control and the series inductance control. In the shunt system, a variable inductance is normally placed across the deflection yoke or across a portion of the deflection output transformer winding driving the deflection yoke. As the shunt inductance is decreased, the deflection current amplitude, through the deflection yoke, decreases and provides less deflection. Along with this, the impedance reflected in the anode circuit of the deflection tube driving the output transformer is also decreased so that if a well-known high-voltage pulse step-up arrangement based on a high-voltage winding integral with the transformer is employed, the high voltage developed thereby will normally increase, as the effective circuit inductance has been decreased without changing the circuit capacity. This results in a decrease in return time which produces a higher voltage. A second effect is that the plate current of the horizontal deflection tube will increase. On the other hand, with the series inductance control arrangement, a variable inductance is placed in series with the deflection yoke so that increasing the inductance in this instance will cause a decrease in deflection amplitude. Correspondingly, there will be reflected into the output vacuum tube a higher inductance resulting in lower deflection amplitude thereby tending to decrease the high voltage. Another effect of increasing the effective plate inductance is that the plate current of the output tube will decrease and the screen current will increase. In applications where relatively large size changes are used, this effect may run the screen dissipation outside the tube rating. If the high voltage developed is utilized as a beam accelerating potential for a cathode ray tube, this change in voltage is highly undesirable since defocussing of the beam will occur from one level of deflection amplitude to the next.

Moreover, in the case of the series control, the inductance employed when made sufficiently large, as would be required in the case of the large amplitude range required for "close-up" viewing, is shock excited by the return interval of the deflection cycle thereby to produce objectionable interference in the developed waveform through the deflection yoke.

It is therefore a purpose of the present invention to provide a novel, simple and economical deflection circuit eminently suited for use in television receivers in which it is desirable to provide manual control of the deflection amplitudes by discrete levels over a relatively wide range as is required in the obtaining of the hereinbefore described "close-up" viewing of the picture.

It is another purpose of the present invention to provide a new and improved electromagnetic deflection circuit for cathode ray equipment of the type employing an electromagnetic coupling device having a high-voltage pulse step-up winding for the derivation of a high unidirectional beam accelerating potential for the cathode ray beam, the improved deflection circuit further being of the type provided with a plurality of predetermined discrete deflection levels, embracing a relatively large range, which are to be made available such that the loading and distortion effects on the output vacuum tube generating the wide amplitude range of deflection signals are held substantially constant for all amplitudes of developed signals with the high voltage produced from the high-voltage pulse step-up winding also held substantially constant.

It is yet another purpose of the present invention to provide a compensating system for series inductance type electromagnetic deflection circuit width control arrangements whereby the adjustable range of amplitude is considerably increased without producing deflection signal distortion due to either the shock excitation of the series inductance control or the change in output impedance reflected to the deflection output discharge tube.

In order to realize the above objects, the present invention in its more general form contemplates the use of an electromagnetic coupling device connected between a deflection signal output discharge tube and the electromagnetic deflection yoke. The output device is provided with a plurality of output impedance taps, with the deflection yoke and a control inductance in series therewith, connected in shunt with two of these taps. A selective amplitude control switch is then placed in shunt with at least a portion of the series control inductance for controlling the value of inductance placed in series with the yoke and hence the amplitude of the deflection current through the yoke. A variable correcting impedance is then placed in shunt with another portion of the coupling device output with the control of the variable correcting impedance being synchronized with the action of the series inductance shunting switch so that as the series yoke inductance is decreased in value, the shunt correcting impedance is increased in value to maintain the impedance across the output discharge tube substantially constant. The present invention further contemplates the use of a series combination of a capacitance and resistance placed in shunt with the control inductance in series with the deflection yoke so as to frequency discriminatively damp free oscillation of the series inductance due to shock excitation by transients in the deflection current thereby to minimize objectionable interference from this source in the developed deflection signal.

A more detailed understanding of the operation of the present invention, as well as other objects, features and advantages will become more apparent after reading of the following specification especially when taken in connection with the accompanying drawing in which the single figure illustrates one form of the present invention as applied to a typical television receiver arrangement.

Referring now to the figure, there is indicated in block form at 10 a number of components of a typical television receiver such as, for example, the R. F. (radio frequency) tuner which includes a superheterodyned mixer and oscillator, the associated sound channel, the video intermediate frequency amplifier which is followed by a video demodulator and video amplifier. The output of the video amplifier is indicated for connection with the control electrode of an image reproducing device such as, for example, the kinescope 12. Typical circuit arrangements suitable for use in the block 10, as well as other receiver components hereinafter to be described in block form, are more fully illustrated in an article entitled "Television Receivers" by Anthony Wright, appearing in the RCA Review for March 1947.

In accordance with conventional television receiver design, a portion of the received demodulated video signal is applied to a sync signal separator circuit shown at 14, which develops at its output both vertical and horizontal sync signals for control of the vertical and horizontal deflection signal generators respectively shown at 16 and 18. The vertical deflection signal generator is adapted for driving the vertical deflection output stage 20, whose output signal is made available at terminals Y—Y intended for connection with the vertical deflection coil terminals Y—Y of the deflection yoke 22. Correspondingly, the output of the horizontal deflection signal generator 18 is applied for excitation of the grid 24 of the horizontal output discharge tube 26. As indicated, conventional cathode bias for the horizontal output stage is provided by means of a cathode resistor 28 by-passed by the capacitor 30.

In accordance with the present invention as autotransformer 32 having taps *a*, *b*, *c*, *d*, *e*, *f*, and *g* has a portion of its winding *a*—*f* connected in series with the capacitor 34 and variable linearity inductance 36 to form a combination which is in turn placed between the anode 38 of the output discharge tube 26 and a source of positive "B" potential having a terminal at 40. The horizontal winding 42 of the deflection yoke 22 is then connected in series with a variable width control inductance 44 to, in turn, form a combination which is placed in shunt with that portion of the autotransformer winding residing between taps *a* and *d*. To minimize any adverse influence of ringing voltage across the inductance 44, the present invention, as described more fully later herein, employs a series combination of a capacitance 46 and resistance 48 which, as shown, is placed in shunt with the inductance.

In still further accordance with the present invention, there are provided balancing inductances 50 and 52 which, through the action of the selector switch 54 and relay switch having armature 56 cooperating with contacts 58 and 60, are utilized as more fully described hereinafter to maintain a desirable constant load impedance in the output circuit of the discharge tube 26. As shown, these inductances 50 and 52 may be conditionally placed in shunt with that portion of the autotransformer winding residing between the taps *a*—*b*. The selector switch 54 may be positioned at contacts 62 or 64 to provide some control over the deflection amplitude provided by the deflection circuit when in its, what will be termed, normal operating mode in contradistinction to its expanded or "close-up" mode. Another relay switch armature 66, actively cooperating with contact 68 as determined by the relay winding 70 controlled by push-button switch 72, is provided for conditionally shunting out or by-passing the inductance 44 upon energization of relay 70. As illustrated by the dotted line linkage indication at 74, the relay armatures 56 and 66 operate isochronously with one another through the action of the relay winding 70. A power source 71 for the relay 70 is shown illustratively as a battery, but it will be understood that this may be any convenient power source.

A reaction scanning damping tube 78 is then provided with its anode 80, connected with the junction of capacitor 34 and variable linearity inductance 36, and its cathode 82 connected with tap *e* on the autotransformer. The heater 84 of the damping discharge tube 78, being excited by any suitable source of heater potential applied at terminal Z—Z thereof, is further connected with tap *c* of the autotransformer 32 in order to reduce the adverse effect of heater-ground capacity. This effect is described in greater detail and claimed in U. S. Patent application by Otto H. Schade, Serial No. 95,096 entitled "High Efficiency Cathode Ray Deflection System," filed May 24, 1949 and need not be further explained herein as a knowledge of the details thereof is not necessary to a thorough understanding of the present invention. Capacitor 86, connected between tap *a* of the autotransformer and ground, is provided as part of the linearity control circuit associated with variable linearity inductance 36 which, in the arrangement shown, permits the obtaining of a "B" boost power supply potential at the autotransformer tap *a*. The circuitry and operation of this linearity control arrangement, as well as the obtaining of the "B" boost output at tap *a* of the autotransformer, are in themselves more fully described in a co-pending U. S. patent application by Edwin L. Clark et al. entitled "Power Recovery Cathode Ray Beam Deflection Systems," Serial No. 95,107 filed May 24, 1949, issued January 2, 1951 as Patent No. 2,536,839 and need not be further explained herein as a knowledge of the details thereof is not necessary to a thorough understanding of the present invention. As also shown in the last-referenced U. S. patent application and as shown on the accompanying drawing, it is further convenient to derive unidirectional accelerating potential for the kinescope accelerating electrode 88, from a rectifier 90 connected for rectification of deflection fly-back transients appearing across the autotransformer winding *f*—*g*. The heater of the rectifier 90 may be supplied from auxiliary transformer winding 92 while the rectified pulses may be filtered and stored through the action of capacitor 94.

In understanding the operation of the present invention, it will be arbitrarily assumed that the relay 70 is to be energized only during the expanded deflection amplitude or "close-up" operating mode of the deflection circuit so that the relay switches 56 and 66 are shown in the figure in their normal or reduced deflection amplitude positions. Under these normal conditions, the deflection current variations in the deflection output tube 26 anode circuit in accordance with the driving signal obtained from the horizontal deflection generator 18 will cause a substantially sawtooth of deflection current to be developed through the horizontal deflection winding 42 of the deflection yoke 22, as well as through the series inductance 44 connected in series with this yoke winding. As more fully described in the above-referenced U. S. patent application by Edwin L. Clark et al., Serial No. 95,107, this sawtooth of current comprises two portions, the first portion being attributable to magnetic energy stored in the deflection circuit at the end of the previous deflection cycle and effectively captured by the damping diode 78, while the second portion is due to actual current flow in and power delivery from the discharge tube 26. Appropriate adjustments in the waveform of the developed sawtooth, to obtain linear scansion on the face of the kinescope 12, is as described in the Clark application, controllable by varying the value of the inductance 36 which changes the alternating current bias imposed on the damping diode 78 during its damping action, thereby tending to more suitably match the transfer characteristics of the output discharge tube 26 with the damping diode characteristics 78. In further accord with this general arrangement, damping current through the diode 78 flows in such a direction as to charge capacitors 34 and 84 with the polarity indicated at their terminals thereby to provide from captured or recovered magnetic energy in the system, a positive voltage at terminal *a* of the autotransformer which is substantially in excess of the positive "B" voltage appearing at terminal 40 of the power supply.

The inductance 44, placed in series with the horizontal winding 42 in accordance with the present invention, will act to restrict current flow through the winding 42 and thereby limit the amplitude of deflection available from the circuit under this normal condition.

Furthermore, under the normal circuit condition, selector switch 54 is operative, through the agency of the contact 58 and armature 56 of the relay 70, to selectively place either the inductance 52 or capacitor 64 across the winding section $a$—$b$ of the autotransformer. Selector switch armature 54 may, by positioning to contact 62 thereof, remove the application of either the inductance or capacitance across this transformer winding section $a$—$b$. It will be manifest however, that with the inductance 52 actually in shunt with the winding section $a$—$b$, the amplitude of deflection current applied to the winding 42 will be less than when the armature switch 54 is positioned to contact 62, the latter removing the inductance. Moreover, the effective width of the television raster may be further increased by placing capacitor 64 across the winding section $a$—$b$. This latter connection, although not actually increasing the amplitude of deflection signal, does decrease the free resonant frequency of the autotransformer 32 by placing a capacitance across a portion of it. Thus, when the capacitor 64 is selected by the selector switch 54, the return time of the deflection cycle is greater thereby making the percentage of an individual horizontal line in the raster modulated by video information, correspondingly greater to appear as though the width of the reproduced picture were greater. Therefore, the selector switch 54 in the normal position effectively provides three discrete picture widths, the smallest of which may be adjusted by varying the value of inductance 52.

Now should, in accordance with the present invention, it be desired to increase the amplitude of the horizontal deflection for "close-up" viewing as described hereinbefore, it is merely necessary to close switch 72 thereby energizing relay 70 and causing the armatures 56 and 66 to contact their lower respective contacts 60 and 68. Under these positions of the switches, it can be seen that the series inductance 44 is by-passed by contact 68 cooperating with armature 66 thereby reducing the impedance of the series yoke circuit connected across the autotransformer winding $a$—$d$ and increasing the current therethrough. The increased amplitude in current of course represents an increase in the beam deflection produced by the yoke 22. However, were the by-passing of inductance 44 the only action accompanied by the energization of relay 70, the load impedance presented to the output tube 26 would decrease and the value of the high-voltage pulse induced in the pulse step-up winding $f$—$g$ and consequently the value of the unidirectional potential applied to the accelerating electrode 88, would decrease thereby defocussing the kinescope beam. Moreover, this change in the load impedance presented to the discharge tube 26 would cause operation thereof on a different part of its dynamic characteristic and consequently tend to produce distortion in the developed deflection signal.

However, due to the concomitant switching action of the armature 56, separating from contact 58 and engaging contact 60, as provided by the present invention, the inductance 52 is replaced by a higher value of inductance 50. In the practice of the present invention, it is desirable to make the inductance 50 sufficiently higher than the inductance 52 to compensate for the reduction in the yoke circuit impedance applied across terminals $a$—$d$ due to the by-passing of inductance 44. Correspondingly, increasing the value of inductance placed in shunt across terminals $a$—$b$ will itself permit a larger deflection current through the yoke 42 thereby increasing the amplitude of deflection as is desired. By properly relating the values of the inductances 44, 50, and 52, the transition of the deflection circuit from normal deflection amplitude to expanded deflection amplitude can be made without substantially changing the net load impedance presented to the discharge tube 26 or the developed high-voltage applied to the kinescope accelerating electrode 88.

As hereinabove noted, the inductance 44 is shunted by a series combination of capacitance 46 and resistance 48 which, in the practice of the present invention, are so proportioned to effect virtual critical damping of the inductance 44 when the circuit is in its normal operating or reduced amplitude deflection mode. It is apparent that since the resistance 48 will be effectively across the inductance 44 for only those frequencies at which the reactance of capacitance 46 is low, the damping of the inductance will be effective only at the higher frequencies and the effect of the damping network across the inductance will be virtually nil at lower frequencies. Thus, it will be that unwanted relatively high frequency ringing of the inductance 44 when shock excited by the transients in the deflection cycle will be damped and kept from presenting interference undulations in the developed waveform. It will accordingly be realized that this aspect of the present invention is in no way limited to use in the particular form of sweep expansion circuit shown, but will find utility in removing unwanted circuit disturbances in any form of series inductance width control for electromagnetic deflection yokes.

It is further obvious that the novel switching and compensating arrangement of the present invention is in no way limited in its applications to horizontal deflection circuits alone. A similar switching arrangement could be employed in the vertical deflection circuit indicated by the block 20 which, of course, would not necessarily need the reaction scanning diode 78 or the particular form of linearity control employing the variable linearity inductance 36. As noted above, to obtain the proper "close-up" viewing effect, both the vertical and horizontal deflection must be expanded concomitantly although means for doing this is not shown in the drawing since this cooperative action in itself does not form a part of the present invention.

It may moreover be desirable to provide the facility of the present invention in television equipments other than receivers as, for example, studio monitors and the like. Evidently, the present invention could be successfuly used in providing predetermined scale expansions of beam deflection in radar equipment, teleran, shoran, and the other like equipments employing electron beam deflection. Utility of the present invention is furthermore not to be construed as limited to the autotransformer arrangement shown since the effect of the switching arrangement could be successfully applied to iso-transformers having separated primary and secondary windings.

Having thus described my invention, what I claim is:

1. In a deflection circuit employing an electron discharge tube designated for excitation of an electromagnetic deflection yoke at predetermined discrete deflection amplitudes, the combination of, an electromagnetic coupling device having an input and an output, the input of said coupling device being connected with the output of said electron discharge tube, the output of said coupling device being provided with a plurality of output impedance levels, a large inductance and a small inductance, connections placing said large inductance in series with the electromagnetic deflection yoke to form a combination of, connections placing said combination in shunt with a high impedance portion of said coupling device output, a first switching means connected in shunt with said large inductance for conditionally by-passing at least a portion thereof, a second switching means for conditionally placing said small inductance in shunt with a low impedance portion of said coupling device output, means for synchronizing and phasing the action of said first and second switching means relative to one another such that said smaller inductance is switched in shunt with said low impedance portion of said coupling device output only when said first switching means is active to shunt at least a portion of said larger impedance, the value of said smaller inductance being so chosen relative to said coupling device output impedance conditionally embraced thereby such that the impedance reflected to said electron discharge tube is virtually constant regardless of the switched position of said first and second switching means.

2. Apparatus according to claim 1 wherein said larger inductance is shunted by the series combination of a resistance and capacitance, the values of said resistance and capacitance being such to further minimize the impedance variation presented to said electron discharge tube during switching of said first and second switching means.

3. Apparatus according to claim 1 wherein there is additionally provided a medium inductance connected with said second switching means and wherein said second switching means is such to impose said medium inductance in shunt with that low impedance portion of said coupling device output conditionally embraced by said small inductance only during the action of said first switching means to unby-pass said large inductance, said medium inductance being variable in nature whereby the amplitude of deflection signal may be vernierly controlled during the operation of said first switching means to unby-pass said larger inductance.

4. Apparatus according to claim 1 wherein there is additionally provided a unidirectionally conductive discharge device having at least an anode and a cathode, connections placing said unidirectionally conductive discharge device in shunt with an even larger portion of said coupling device output impedance than embraced by the series combination of said deflection and large inductance.

5. In an electromagnetic deflection circuit employing an electron discharge tube having an anode circuit designated for excitation of an electromagnetic deflection coil, the combination of, an autotransformer having a first tap termed an impedance datum with at least a second and third tap thereon defining progressively higher impedance levels relative to said first tap, a large inductance and a small inductance, connections placing said large inductance in series with said deflection yoke to form a combination, connections placing said yoke and inductance combination between said first and second taps on said autotransformer, a first switching means connected in series with said small inductance to form a combination which is in turn placed across two taps on said autotransformer embracing a winding portion thereon substantially less than embraced between said first and second taps, a second switching means connected in shunt with at least a portion of said larger inductance for selective by-passing thereof, connections placing said autotransformer winding first and third taps in series with the anode circuit of said electron discharge tube and synchronizing means connected for controlling the action of said first and second switching means such that said first switching means is active to impose said smaller inductance across said autotransformer winding only during the action of said second switching means to by-pass a portion of said larger inductance.

6. In an electromagnetic deflection circuit employing an electron discharge tube having an anode circuit designated for excitation of an electromagnetic deflection coil, the combination of, an autotransformer having a first tap termed an impedance datum with at least a second and third tap thereon defining progressively higher impedance levels relative to said first tap, connections placing said first and third autotransformer winding taps in series with the anode circuit of said discharge tube, a variable inductance means adapted for selective switching between predetermined discrete inductance values, connections placing said variable inductance means in shunt with a portion of said autotransformer winding, an inductance, connections placing said inductance in series with the electromagnetic deflection yoke to form a combination, connections placing said yoke and inductance combination between said autotransformer first and second taps switching means connected in shunt with at least a portion of said series inductance and synchronizing means between said variable inductance means and said switching means such that said variable inductance is increased in value when said switching means is active to shunt said inductance, the increase in inductance of said variable inductance means being such to present a virtually constant anode circuit impedance to said electron discharge tube regardless of the action of said switching means.

7. Apparatus according to claim 6 wherein there is additionally provided a unilaterally conductive discharge device connected between said autotransformer first winding tap and a tap between said autotransformer second and third tap, such to provide reaction scanning operation of the deflection circuit and wherein there is additionally provided a series combination of a resistance and capacitance placed in shunt with said series inductance, the value of said capacitance and resistance being such to substantially damp free-ringing oscillation of said series inductance resulting from reaction scanning excitation.

8. Apparatus according to claim 7 wherein there is additionally provided a combination a capacitance and variable inductance connected in series with the autotransformer in the anode circuit of said discharge tube and wherein the connection of said unilaterally conductive discharge device to said autotransformer first winding tap includes said last-named capacitance such that there is developed at said autotransformer winding terminal a unidirectional voltage substantially in excess of the anode circuit supply voltage for said discharge tube, the developed voltage being substantially independent of the switched position of said switching means.

9. In an electromagnetic cathode ray beam deflection system employing an electron discharge tube having its anode circuit designated for excitation of an electromagnetic deflection yoke, the combination of, an electromagnetic coupling device having its input connected to the anode circuit of said discharge tube and its output having terminals adapted for connection with the deflection yoke, reaction scanning damping means connected in shunt with the output of said coupling device, a variable inductance, a resistance and capacitance connected in series to form a combination, connections placing said resistance-capacitance combination in shunt with said inductance, and connections placing said inductance in series with said coupling device output in its connection with said deflection yoke, the value of said resistance and capacitance being so chosen as to substantially damp ringing oscillation of said inductance when excited by said reaction scanning circuit action.

10. In an electromagnetic deflection circuit employing an electron discharge tube having an anode circuit designated for excitation of an electromagnetic deflection coil, the combination of, an autotransformer having a first tap termed an impedance datum with at least a second and third tap thereon defining progressively higher impedance levels relative to said first tap, connections placing said autotransformer first and third taps in series with the anode circuit of said discharge tube, a large, medium and small inductance, connections placing said large inductance in series with the deflection yoke to form a combination, connections placing said yoke and inductance combination between said autotransformer first and second winding taps, a first switching means for selectively shunting a portion of said large inductance, a connection between one extremity of each of said medium and small inductances with a tap on said autotransformer, selective switching means having a single-pole double throw action employing a first and second contact positioned on either side of an armature, respective connections from the free extremities of each of said medium and smaller inductances to the first and second contacts of said switching means, a connection from said switching means armature to another tap on said autotransformer, and synchronizing means coupled with said first switching means and said selective switching means such that said small inductance is placed in shunt with said autotransformer winding when said first switching means is by-passing said large inductance while said medium inductance is placed in shunt with said autotransformer winding when said first switching means is by-passing said large inductance.

11. Apparatus according to claim 10 wherein there is additionally provided a series combination of a capacitance and resistance, and connections placing said capacitance-resistance combination in shunt with said large inductance, the values of the capacitance and resistance forming the last-named combination being such to substantially critically damped free-ringing oscillation of the large inductance.

12. Apparatus according to claim 11 wherein there is additionally provided a damping diode having an anode and a cathode with a connection from said damping diode cathode to a point intermediate between said autotransformer second and third winding taps and an electrical path from said damping diode anode to said first autotransformer winding tap.

13. Apparatus according to claim 12 wherein there is additionally provided the series combination of an inductance and capacitance connected in series with said autotransformer first and third winding taps in their series connection in said discharge tube anode circuit wherein the connections of said damping diode anode to said autotransformer first winding tap serially includes the capacitor of said last-named inductance-capacitor series combination.

14. Apparatus according to claim 12 wherein said autotransformer is supplied with an additional winding having a suitably high impedance for the production of high voltage pulses corresponding in time to the return interval of the deflection cycle, means for rectifying said pulses to provide a source of high unidirectional potential and wherein said large, medium and small inductances are so proportioned relative to the impedance of the deflection yoke that the high voltage developed by said rectifying means is substantially constant regardless of the synchronized position of said first switching means and said selective switching means.

CLYDE W. HOYT.

REFERENCES CITED

The following references are of record in the file of this patent:

UNITED STATES PATENTS

| Number | Name | Date |
|---|---|---|
| 2,149,077 | Vance | Feb. 28, 1939 |
| 2,320,551 | Bahring | June 1, 1943 |
| 2,440,418 | Tourshou | Apr. 27, 1948 |